United States Patent [19]

Han

[11] Patent Number: 5,149,111
[45] Date of Patent: Sep. 22, 1992

[54] DISTORTION-FREE EXPANSION/CONTRACTION ARBOR OR CHUCK ASSEMBLY

[76] Inventor: Sil Han, 321 Sunset Dr., Wilmette, Ill. 60091

[21] Appl. No.: 666,358

[22] Filed: Mar. 8, 1991

Related U.S. Application Data

[63] Continuation-in-part of Ser. No. 341,126, Apr. 20, 1989, Pat. No. 5,003,702.

[51] Int. Cl.$^5$ .................... B23B 31/40; B23B 31/20
[52] U.S. Cl. .................... 279/2.03; 279/46.9; 279/51; 279/156; 279/157
[58] Field of Search ............ 279/2 R, 2 A, 51-53, 279/58, 46 R, 59, 2.02, 2.03, 46.9, 156, 157; 269/48.1-48.4

[56] References Cited

U.S. PATENT DOCUMENTS

| | | | |
|---|---|---|---|
| 1,263,472 | 4/1918 | Saurer | 33/501.13 |
| 1,282,348 | 10/1918 | Wirrer | 33/501.13 |
| 1,424,940 | 9/1923 | Miles | 74/625 |
| 1,445,631 | 2/1923 | Lotz | 33/501.19 |
| 2,014,668 | 7/1933 | Rinderknecht | 33/501.7 |
| 2,318,970 | 9/1941 | Richmond | 33/501.13 |
| 2,585,528 | 5/1948 | Aeppli | 33/501.13 |
| 2,819,906 | 1/1958 | Sloan | 279/2 R |
| 3,031,765 | 3/1959 | Müller | 33/501.13 |
| 3,126,166 | 3/1964 | Weinberg | 74/545 |
| 3,358,374 | 12/1967 | Jones, Jr. | 33/501.19 |
| 3,727,929 | 4/1973 | Fink | 279/4 |
| 3,774,313 | 11/1973 | Occhialini et al. | 33/501.19 |
| 3,997,176 | 12/1976 | Wyckoff et al. | 279/2 R |

FOREIGN PATENT DOCUMENTS

| | | | |
|---|---|---|---|
| 2519217 | 11/1976 | Fed. Rep. of Germany | 269/48.1 |
| 974188 | 5/1981 | U.S.S.R. | 73/162 |

*Primary Examiner*—Steven C. Bishop
*Attorney, Agent, or Firm*—Leighton K. Chong

[57] ABSTRACT

An arbor or chuck assembly for holding a workpiece or tool includes an arbor or chuck body having a linear body portion and an or contraction portion with inclined faces, a collet positioned radially between the arbor or chuck body and the workpiece or tool for reciprocal movement along a machine axis and having a linear body portion and an expansion/contraction portion with inclined faces in sliding contact with those of the arbor or chuck body, and a ball bushing provided between the linear surfaces of the collet and arbor or chuck body with a slight interference fit, in order to provide zero clearance and substantially frictionless movement therebetween. Expansion and release of the arbor or chuck is controlled by a compression spring biasing the collet in the expansion direction, and a drawbar for pushing the collet against the spring force in the release direction. The collet may have rubber seals for sealing its slots and expansion apertures from contaminants. A cap mounted on the end of the arbor or chuck body may have a tapered wall which slidingly engages an edge of the collet portion as it reaches the end of its travel in the release direction to avoid deformation.

18 Claims, 4 Drawing Sheets

DISTORTION-FREE EXPANSION/CONTRACTION ARBOR OR CHUCK ASSEMBLY

This application is a continuation-in-part of my co-pending U.S. patent application Ser. No. 07/341,126, filed on Apr. 20, 1989, which issued as U.S. Pat. No. 5,003,702 on Apr. 2, 1991.

FIELD OF THE INVENTION

This invention generally relates to an arbor or chuck assembly, and more particularly, to an assembly having an improved construction for holding an inside or outside diameter of a workpieces or tool by an expansion or contraction member accurately and without distortion.

BACKGROUND ART

In conventional machine tools, such as lathes, drill presses, milling machines, cutters, grinders, gear forming or inspection equipment, etc., a workpiece or tool must be gripped securely and rotated precisely in alignment with a turning axis of the machine tool. For a workpiece or tool with a bore or center hole of a given inside diameter, an arbor assembly typically has a collet as an outward expansion element which is pressed radially outwardly against the internal sides of the bore or center hole by the inclined faces of an arbor body movable axially relative to the expansion element. For a workpiece or tool with a body portion or shaft of a given outside diameter, a chuck assembly typically has a collet as an inward expansion element which is pressed radially inwardly against the external sides of the body portion or shaft by the inclined faces of a chuck body movable relative thereto.

A desired objective for such arbor or chuck assemblies is to be able to expand and release the expansion element to hold a given inside or outside diameter uniformly and with a minimum of offset or distortion, such that the workpiece or tool is repeatedly gripped by the expansion pressure as precisely evenly as possible and rotated with its center axis in precise alignment with the machine tool axis. In conventional assemblies, the arbor or chuck bodies have linear portions which slide along corresponding linear portions of the collet for relative axial movement. The metal-to-metal contact between the linear portions of the movable parts typically has a clearance of from 0.0005 to 0.002 inch. The metal-to-metal contact can also produce sticking, imbalances, or uneven side loads. For high precision work, displacement of the axial position of the workpiece or tool between chucking and unchucking by as little as 0.0005 to 0.002 inch can result in unsatisfactory performance. It is therefore deemed desirable to obtain high precision tolerances of at least an order of magnitude lower or more than such conventional tolerances.

Therefore, it is a principal object of the invention to provide an arbor or chuck assembly which holds a given inside or outside diameter by a movable expansion or contraction member uniformly and with a minimum of distortion. Specifically, it is desired to provide such an assembly in which the arbor or chuck body moves in contact with the movable member with substantially zero clearance and in a substantially frictionless and distortion-free manner.

SUMMARY OF THE INVENTION

In accordance with the invention, an arbor or chuck assembly for holding a workpiece or tool includes an arbor or chuck body in alignment with the machine axis, having a linear body portion with surfaces facing in a radial direction relative to the machine axis and an expansion or contraction portion with inclined faces facing at an inclined angle to the machine axis, an expansion or contraction member positioned radially between the arbor or chuck body and the workpiece or tool and being movable relative to the arbor or chuck body in reciprocal directions in parallel with the machine axis, the expansion contraction member having a linear body portion with surfaces facing radially toward the linear surfaces of the arbor or chuck body and an expansion contraction portion with inclined faces in sliding contact with the inclined faces of the arbor or chuck body, and a ball bushing provided between the linear surfaces of the expansion contract member and arbor or chuck body and being configured and dimensioned for a slight interference fit between the expansion contraction member and the arbor or chuck body for substantially zero clearance and substantially frictionless movement therebetween. The expansion contraction portion of the expansion contraction member is expanded radially into pressure contact with the inside or outside diameter of the workpiece or tool when it is moved relative to the arbor or chuck body in one direction, and released from pressure contact therewith when moved relatively in a release direction.

In the preferred embodiments, expansion or contraction and release of the arbor or chuck is controlled by a compression spring biasing the expansion contraction member relative to the arbor or chuck body in one direction, and actuating means for relatively moving the expansion contraction member against the spring force in the opposite direction. The collet may have rubber seals for sealing its slots and apertures from contaminants. A cap mounted on the end of the arbor or chuck body may have a tapered wall which slidingly engages an edge of the collet portion as it reaches the end of its travel in the release direction to avoid deformation.

The invention also encompasses the method of holding a workpiece or tool by positioning the arbor or chuck body for movement in reciprocal directions in parallel with the machine axis relative to a movable member, and providing the ball bushing between the linear surfaces of the arbor or chuck and the movable member with a slight interference fit for distortion-free, frictionless movement therebetween.

Other objects, features, and advantages of the present invention will become apparent from the following detailed description of the best mode of practicing the invention when considered in conjunction with the drawings, as follows:

DESCRIPTION OF THE PREFERRED EMBODIMENTS

Figure 1:
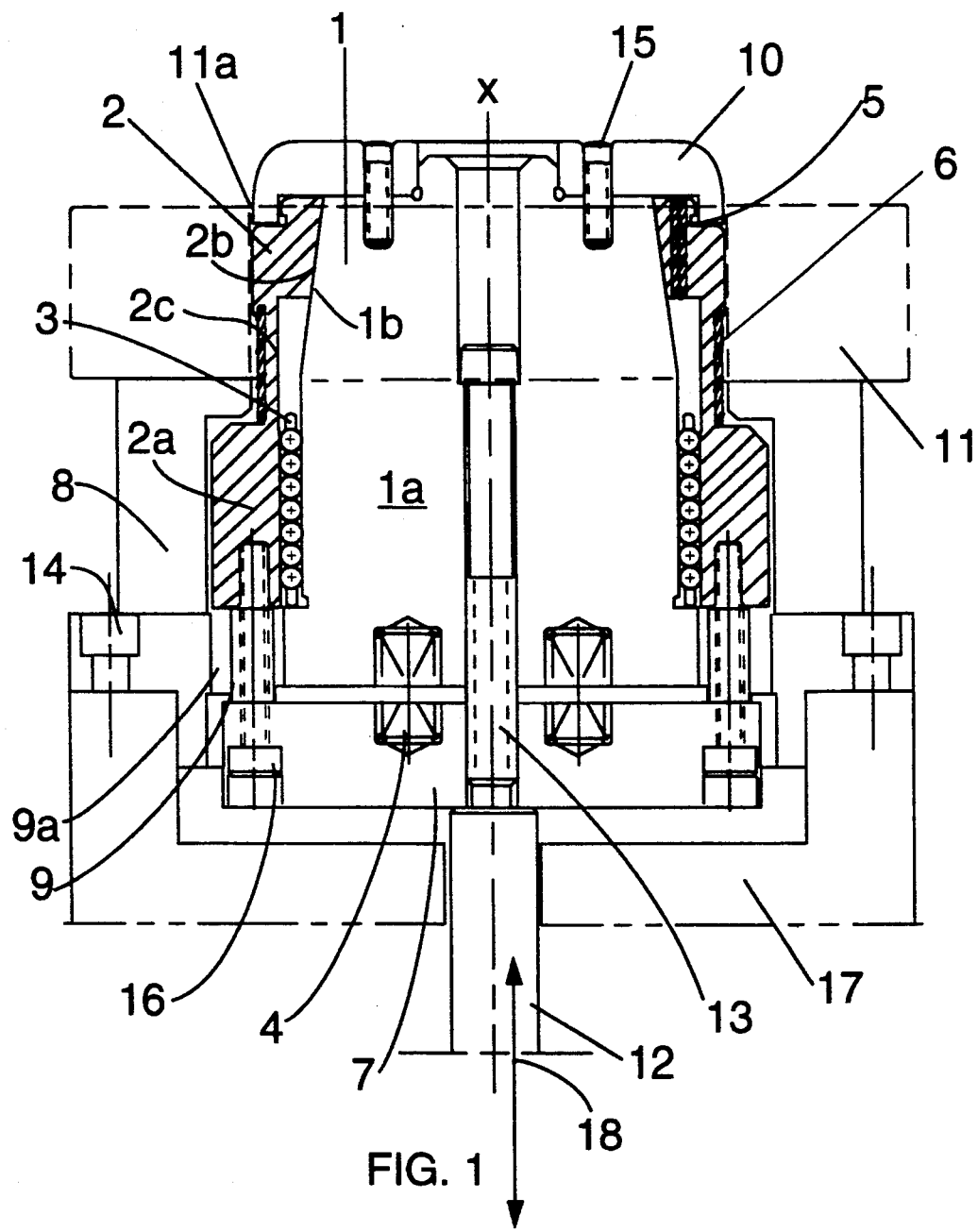
FIG. 1 is a sectional side view of one embodiment of a distortion-free expanding arbor assembly in accordance with the invention.

In one version of the invention shown in FIG. 1, an expanding arbor assembly is used to hold a workpiece or tool 11 which has a bore or center hole 11a of a given inside diameter (ID). The arbor assembly includes an arbor body 1 which is rigid and non-deflective and is the main body used to mount the workpiece or tool 11. It is positioned in alignment with a machine axis X and extends concentrically into the bore or center hole 11a. The arbor body 1 has a linear body portion 1a with outer surfaces facing radially outwardly relative to the machine axis X, and an expansion portion 1b with inclined faces facing outwardly at an inclined angle to the machine axis.

An expansion member 2 in the form of a collet is positioned radially outwardly of the arbor body 1 between the latter and the inside diameter of the workpiece or tool. The collet 2 is positioned to be movable relative to the arbor body 1 in reciprocal directions 18 in parallel with the machine axis X. The collet 2 has a linear body portion 2a with inner surfaces facing radially inwardly toward the outer surfaces of the linear body portion 1a of the arbor body 1, and an expansion portion 2b with inclined faces at an inclined angle to the machine axis facing inwardly in sliding contact with the inclined faces 1b of the arbor body. The expansion portion 2b of the collet 2 is expanded radially outwardly into pressure contact with the inside diameter of the bore or center hole 11a of the workpiece or tool 11 when the collet 2 is moved relative to the arbor body in an expansion direction (downwardly in the figure), and is released from pressure contact therewith when moved in a release direction (upwardly).

In accordance with the invention, a ball bushing 3 is disposed between the inner surfaces of the linear body portion 2a of the expansion member 2 and the outer surfaces of the linear body portion 1a of the arbor body 1. The ball bushing is configured and dimensioned for a slight interference fit between the opposed surfaces to provide substantially zero clearance and for substantially frictionless movement therebetween. The interference fit can be of the order of about 0.0002 to 0.0003 inch. When the ball bushing 3 is fitted between the arbor linear body portion 1a and the collet linear body portion 2a, the ball bearings of the bushing becoming slightly compressed into an ellipsoid shape. This condition removes any clearance or wobble between the sliding surfaces of the collet and arbor body, thus preventing it from becoming an error factor in workpiece tolerance measurements. At the same time, the ball bearings provide a smooth rolling action for the relative movement between the sliding surfaces.

The preferred ball bushing is of the type having a cylindrical bronze cage with a plurality of ball bearings carried therein. Suitable ball bushings are sold or custom designed by Chicago Bearing Manufacturing Company, Chicago, Ill. The ball bearings are precision chrome alloy steel balls, AFBMA Grade #5, with sphericity to 0.000005 inch and size variation of 0.000005 inch. Such ball bushings have been used for guiding axially sliding parts of machines such as punch presses, but have not been used heretofore for the purposes and effects described above.

The interference fit results in zero clearance between the arbor body and collet linear portions, so as to eliminate any distortion, loss of precise alignment, or uneven side loading. The rolling of the ball bearings provides substantially frictionless movement without sticking or locking between the arbor body 1 and collet 2. As a result, the collet can be released and expanded repeatedly to position the workpiece or tool in precisely the same position each time. Tests performed on this interference-fit arrangement showed that for a work spindle having a run out of 0.00002 inch and a test rings having an inside diameter with a tolerance of 0.00003 inch, displacements between chucking and unchucking of between 0.00004 and 0.00007 inch were measured at the outside diameter face of the test ring (as read by an electronic displacement indicator sold by Brown & Sharp Co., North Kingstown, R.I.). The tolerances resulting from the interference-fit arrangement are about one to two orders of magnitude lower than that obtained with conventional arbor or chuck assemblies, and much of the distortion measured is attributable to distortions in the fabrication of the work spindle and the test ring themselves.

The collet 2 is coupled by screws 16 with spacers 9 to a base/spring-holder 7. The spacers 9 slide within guide bushings 9A fixed to supports held by screws 14 to the spindle 17. Compression springs 4 are held in opposing pairs of recesses formed in the base/spring-holder 7 and the bottom wall of the linear body portion 1a of the arbor body 1. The springs 4 bias the collet 2 away from the arbor body 1 in the downward direction of reciprocal directions 18, which is the expansion direction of the collet. The collet is released by actuating a drawbar 12 in the upward direction of reciprocal directions 18, so as to push the base/spring-holder 7 coupled to the collet toward the arbor body 1 against the spring force of the springs 4. The drawbar 12 can be actuated under machine control by hydraulic pressure. As the inclined faces of the expansion portion 2b of the collet move toward the far (upper) end of its travel, the expansion pressure on the inside diameter 11a of the workpiece or tool 11 is released for unchucking it.

Figure 2A:
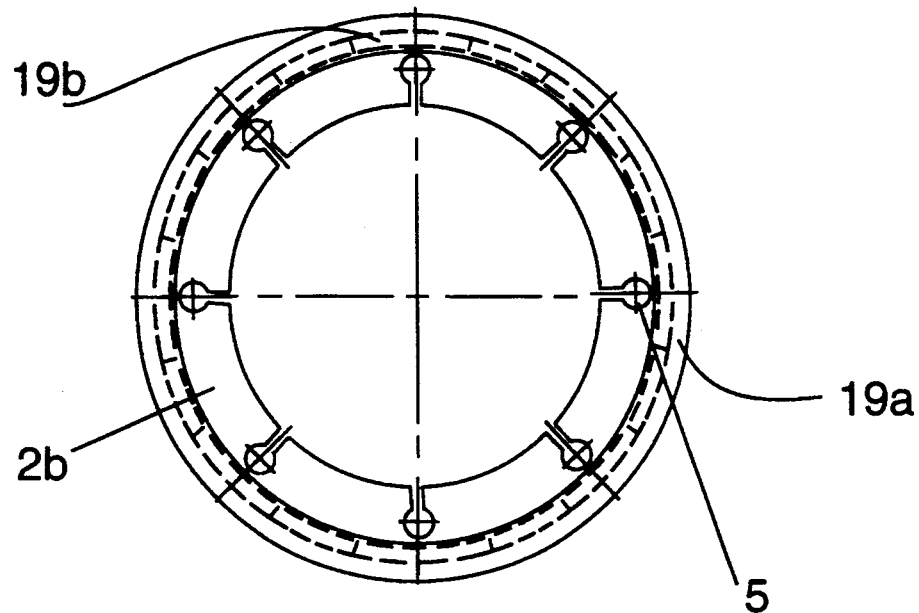
FIGS. 2A and 2B are plan and side sectional views of an expansion member used in an assembly such as shown in FIG. 1.
Figure 2B:
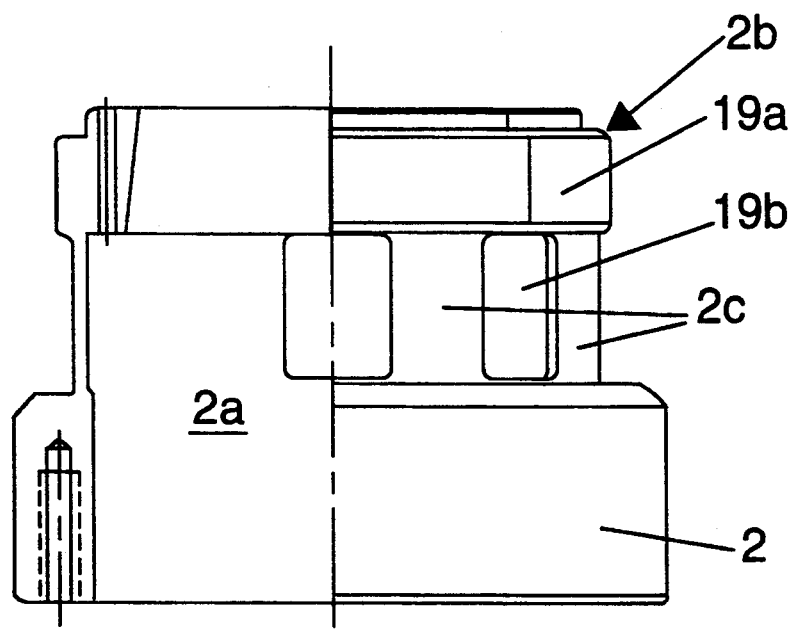

In FIGS. 2A and 2B, the collet 2 is shown in greater detail as having narrow expansion slots 19a between individual elements of its expansion portion 2b, and expansion apertures 19b which are enlarged so that connecting portions 2c between the expansion portion 2b and linear body portion 2a have the requisite flexibility for the expansion movement. The expansion slots 19a are kept narrow for restored seating in the released position, resulting in maintenance of its accuracy of movement. Rubber seals 5 and 6 for provided for sealing off the expansion slots 19a and apertures 19b, respectively, from contaminants.

Other elements of the arbor assembly include a spacer ring 8 for positively locating the chucking position of the workpiece or tool 11 on the assembly, a cap 10 with rounded or bevelled edges secured to the upper end of the arbor body 1 by screws 15 and over the upper end of the expansion portion 2b of the collet 2. Alternatively to actuation by the drawbar 12, the collet 2 may be released or expanded by manually threading an actuator screw 13. Screws 14 are used to mount the arbor assembly on a spindle or fixture 17 of the machine tool.

Figure 3:
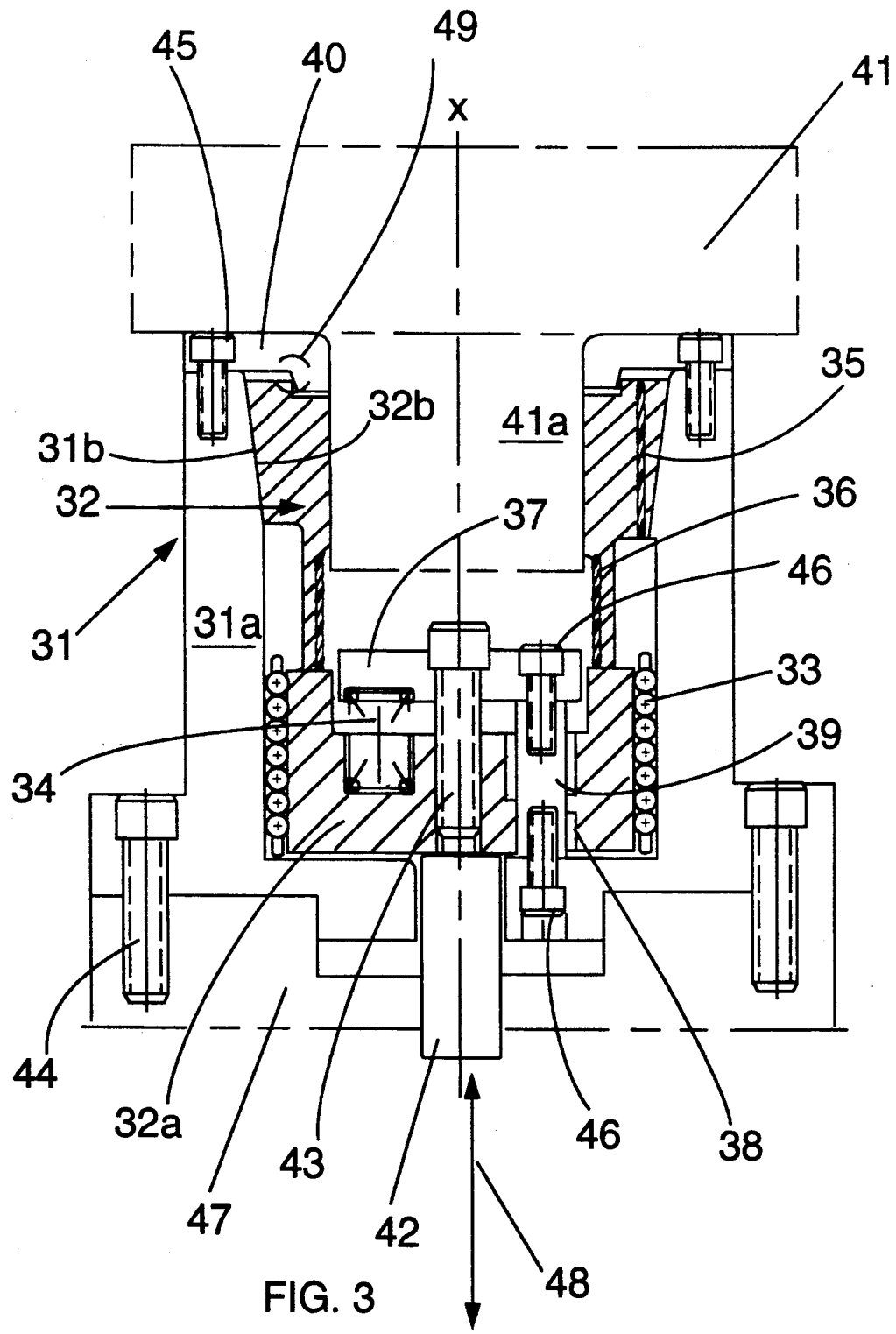
FIG. 3 is a sectional side view of another embodiment of a distortion-free contraction chuck assembly in accordance with the invention.

A contraction chuck version of the invention is shown in FIG. 3 for holding a workpiece or tool 41 which has a shaft or body portion 41a of a given outside diameter (OD). The chuck assembly includes a chuck body 31 used to mount the workpiece or tool 41. It is positioned in alignment with a machine axis X and extends concentrically around the shaft or body portion 41a. The chuck body 31 has a linear body portion 31a with inner surfaces facing radially inwardly, and a contraction portion 31b with inclined faces facing inwardly at an inclined angle to the machine axis.

A contraction expansion member 32 in the form of a collet is positioned radially inwardly of the chuck body 31 between the latter and the outside diameter of the workpiece or tool 41. The collet 32 is movable in reciprocal directions 48 in parallel with the machine axis X. The collet 32 has a linear body portion 32a with outer surfaces facing radially outwardly toward the surfaces of the linear body portion 31a of the chuck body 31, and a contraction portion 32b with inclined faces in sliding contact with those of the chuck body 31. The contraction portion 32b of the collet 32 is contraction radially inwardly into pressure contact with the outside diameter of the shaft 41a of the workpiece or tool 41 when the collet 32 is moved relative to the chuck body in a contraction direction (downwardly in the figure), and is released when moved in a release direction (upwardly).

As previously described, a ball bushing 3 is disposed between the surfaces of the linear body portion 32a of the contraction member 32 and those of the linear body portion 31a of the chuck body 31 with a slight interference fit for zero clearance and frictionless movement therebetween. Similar results in zero clearance and distortion-free chucking and unchucking are obtained as described for the expanding arbor assembly.

A lower part of the chuck body 31 is fixedly connected by spacers 39 and screws 46 to a base/spring-holder 37. Guide bushings 38 are provided in the lower part of the collet linear body portion 32a for sliding movement over the surfaces of the spacers 39 so that the collet 32 can move relative to the chuck body 31 in parallel with the machine axis X. Compression springs 34 are fitted between the base/spring-holder 37 and the bottom wall of the linear body portion 31a of the chuck body 31. The springs 34 bias the collet 32 away from the chuck body 31 in the contraction direction of the collet. The collet 32 is released by actuating a drawbar 42 in the upward direction so as to push the collet 32 in the release direction against the spring force of the springs 34.

Figure 4:
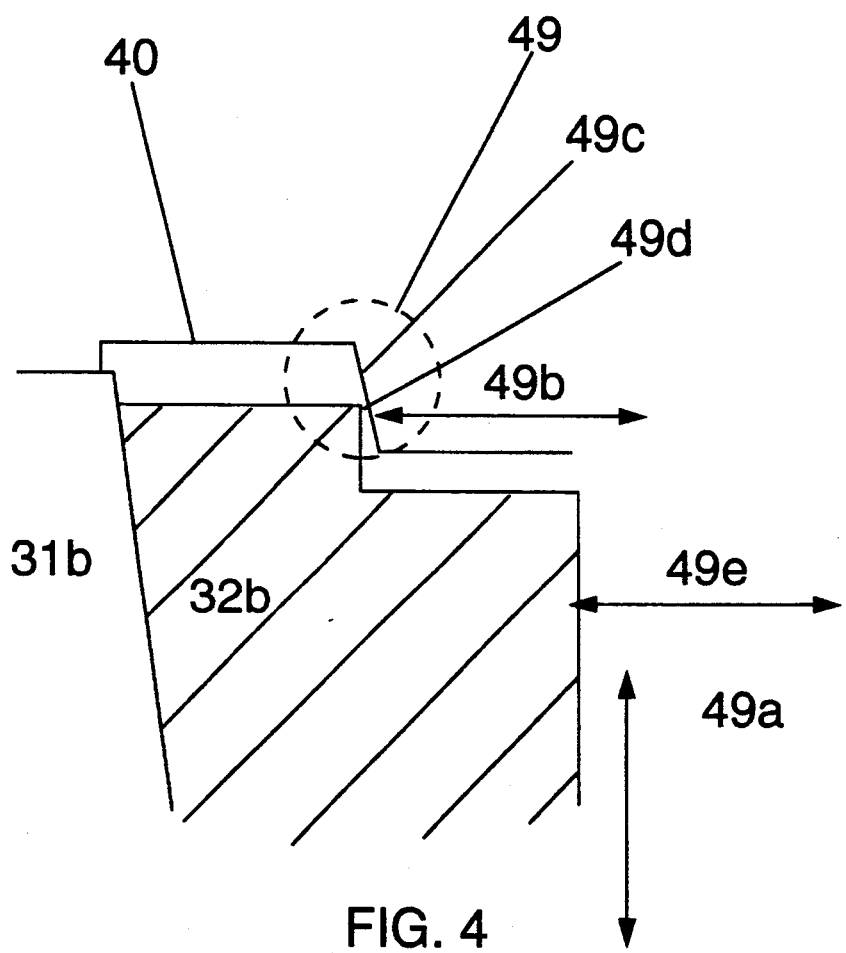
FIG. 4 is a detailed side sectional views of a contraction member used in an assembly such as shown in FIG. 3.

FIG. 4 shows another detail (reference numeral 49 in FIG. 3) of the collet for the contraction arbor or chuck assembly. As in the arbor embodiment, a cap 40 is secured to the upper end of the chuck body 31 by screws 45. In FIG. 4, reference numeral 49A indicates the contraction and release directions of the collet 32, 49B indicates the contraction and release movements of the collet expansion portion 32b, 49C indicates an inner tapered wall of the cap 40, 49D indicates an inner edge of the collet contraction portion 32b, and 49E indicates the clearance of the chuck contraction portion 32b from the outside diameter of the shaft 41a.

As the collet 32 is pushed upward in the release direction 49A, the inner edge of the collet contraction portion 32b slides along the inner tapered wall 49C of the cap 10 as it reaches its upper end of travel, and becomes slightly wedged as it reaches its stop position. This wedging action prevents the collet contract portion 32b from butting against the end wall of the cap 40, thereby preventing its deformation and maintaining the precision of its shape and movement.

Other elements of the arbor assembly include an actuator screw 43 by which the collet 32 may be released or contracted by manually threading, seals 35 and 36 for the slots and apertures of the collet, and screws 44 used to mount the chuck assembly on a spindle or fixture 17 of the machine tool.

Numerous modifications and variations are of course possible in light of the above disclosure of the basic principles of the invention. It is intended that all such modifications and variations which may be devised be considered within the spirit and scope of the invention as defined in the appended claims.

I claim:

1. A distortion-free expanding arbor assembly, for holding a workpiece or tool having a bore or center hole of a given inside diameter in alignment with a machine axis, comprising:

an arbor body positioned in alignment with the machine axis, said arbor body having a linear body portion with outer surfaces facing radially outwardly relative to the machine axis and an expansion portion with inclined faces facing outwardly at an inclined angle to the machine axis;

an expansion member positioned radially outwardly of said arbor body and being movable relative to said arbor body in reciprocal directions in parallel with the machine axis, said expansion member having a linear body portion with inner surfaces facing radially inwardly toward the outer surfaces of said linear body portion of said arbor body and an expansion portion with inclined faces at an inclined angle to the machine axis facing inwardly in sliding contact with the inclined faces of said arbor body, said expansion portion being expanded radially outwardly into pressure contact with the inside diameter of the bore or center hole of the workpiece or tool for holding the same securely when said expansion member is moved relative to said arbor body in an expansion direction, and being released from pressure contact therewith when moved relatively in a release direction; and a ball bushing disposed between the inner surfaces of said linear body portion of said expansion member and the outer surfaces of said linear body portion of said arbor body and being configured and dimensioned for a slight interference fit to provide substantially zero clearance of said inner surfaces of said expansion member and said outer surfaces of said arbor body and for substantially frictionless movement therebetween.

2. An expanding arbor assembly according to claim 1, further including biasing means for biasing said expansion member relative to said arbor body with a spring force for relative movement in one of said release and expansion directions; and actuating means for moving said expansion member relative to said arbor body against the spring force of said biasing means in the other of said release and expansion directions.

3. An expanding arbor assembly according to claim 2, wherein said biasing means is constituted by a base/spring-holder which is positioned at one end of said arbor body in the direction of the machine axis and connected by connecting means to said expansion member, and compression springs fitted in opposing recesses in and compressed between said one end of said arbor body and said base/spring-holder.

4. An expanding arbor assembly according to claim 3, wherein said connecting means are screws joining said expansion member and said base/spring-holder which are sleeved in spacers, and said spacers are slidably guided within guide bushings fixed to supports mounting said arbor body in order to guide the movement of said expansion member in reciprocal directions along the machine axis.

5. An expanding arbor assembly according to claim 2, wherein said actuating means includes a mechanically driven drawbar for pushing said base/spring-holder against the spring force of said biasing means.

6. An expanding arbor assembly according to claim 1, wherein said expansion member is a collet having a plurality of collet expansion elements circumferentially spaced around said arbor body.

7. An expanding arbor assembly according to claim 6, wherein said collet has expansion slots provided between said collet expansion elements, and rubber seals for sealing said expansion slots from contaminants.

8. An expanding arbor assembly according to claim 1, further including an end cap mounted on the end of the arbor body having a tapered wall which slidingly engages an edge of said expansion portion of said expansion member as it reaches an end of travel in the release direction, in order to avoid deformation of the same upon reaching the end of travel.

9. A distortion-free contraction chuck assembly, for holding a workpiece or tool having a body portion or shaft of a given outside diameter in alignment with a machine axis, comprising:
   a chuck body positioned in alignment with the machine axis, said chuck body having a linear body portion with inner surfaces facing radially inwardly relative to the machine axis and a contraction portion with inclined faces facing inwardly at an inclined angle to the machine axis;
   a contraction member positioned radially inwardly of said chuck body and being movable relative to said chuck body in reciprocal directions in parallel with the machine axis, said contraction member having a linear body portion with outer surfaces facing radially outwardly toward the inner surfaces of said linear body portion of said chuck body and a contraction portion with inclined faces at an inclined angle to the machine axis facing outwardly in sliding contact with the inclined faces of said chuck body, said contraction portion being contracted radially inwardly into pressure contact with the outside diameter of the body portion or shaft of the workpiece or tool for holding the same securely when said contraction member is moved relative to said chuck body in a contraction direction, and being released from pressure contact therewith when moved relatively in a release direction; and
   a ball bushing disposed between, the outer surfaces of said linear body portion of said contraction member and the inner surfaces of said linear body portion of said chuck body and being configured and dimensioned for a slight interference fit to provide substantially zero clearance of said outer surfaces of said contraction member and said inner surfaces of said chuck body and for substantially frictionless movement therebetween.

10. A contraction chuck assembly according to claim 9, further including biasing means for biasing said contraction member relative to said chuck body with a spring force for relative movement in one of said release and contraction directions; and
   actuating means for moving said contraction member relative to said chuck body against the spring force of said biasing means in the other of said release and contraction directions.

11. A contraction chuck assembly according to claim 10, wherein said biasing means is constituted by a base/spring-holder which is positioned at one end of said chuck body in the direction of the machine axis and connected by connecting means to said chuck body, and compression springs fitted in opposing recesses in and compressed between said one end of said chuck body and said base/spring-holder.

12. A contraction chuck assembly according to claim 11, wherein said connecting means are screws joining said one end of said chuck body and said base/spring-holder which are sleeved in spacers, and said contraction member has guide bushings fixed thereto which are slidably guided on said spacers in order to guide the movement of said contraction member in reciprocal directions along the machine axis.

13. A contraction chuck assembly according to claim 10, wherein said actuating means includes a mechanically driven drawbar for pushing one end of said contraction member against the spring force of said biasing means.

14. A contraction chuck assembly according to claim 9, wherein said contraction member is a collet having a plurality of collet contraction elements circumferentially spaced facing the inclined faces of said chuck body.

15. A contraction chuck assembly according to claim 14, wherein said collet has contraction slots provided between said collet contraction elements, and rubber seals for sealing said contraction slots from contaminants.

16. A contraction chuck assembly according to claim 9, further including an end cap mounted on the end of the chuck body having a tapered wall which slidingly engages an edge of said expansion portion of said contraction member as it reaches an end of travel in the release direction, in order to avoid deformation of the same upon reaching the end of travel.

17. A method for holding a workpiece or tool, having a given inside or outside diameter, in alignment with a machine axis, comprising the steps of:
   positioning a mounting body in alignment with the machine axis, said mounting body having a linear body portion with surfaces facing in a radial direction relative to the machine axis and an expansion or contraction portion with inclined faces facing at an inclined angle to the machine axis;
   positioning an expansion/contraction member radially between said mounting body and the inside or outside diameter of the workpiece or tool, said expansion/contraction member being movable relative to said mounting body in reciprocal directions in parallel with the machine axis, said expansion/contraction member having a linear body portion with surfaces facing radially toward the surfaces of said linear body portion of said mounting body and an expansion/contraction portion with inclined faces at an inclined angle to the machine axis facing in sliding contact with the inclined faces of said mounting body, said expansion/contraction portion being pressed radially into pressure contact with the inside or outside diameter of the workpiece or tool for holding the same securely when said expansion/contraction member is moved relative to said mounting body in an expansion/contraction direction, and being released from pressure contact therewith when moved relatively in a release direction; and providing a ball bushing between the surfaces of said linear body portion of said expansion/contraction member and the surfaces of said linear body portion of said mounting body, said ball bushing being configured and dimensioned for a slight interference fit to provide substantially zero clearance of said surfaces of said expansion/contraction member and said mounting body and for substantially frictionless movement therebetween.

18. A method for holding a workpiece or tool according to claim 17, further including the steps of biasing said expansion/contraction member relative to said mounting body with a spring force in one of said release and expansion/contraction directions; and moving said contraction member relative to said mounting body against the spring force in said biasing step in the other of said release and expansion/contraction directions.

* * * * *